(12) United States Patent
Johnson et al.

(10) Patent No.: US 7,139,151 B2
(45) Date of Patent: Nov. 21, 2006

(54) BAND IDENTIFICATION IN TIME-BASED SERVOPOSITIONING FORMATS

(75) Inventors: Douglas W. Johnson, Stillwater, MN (US); Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 518 days.

(21) Appl. No.: 10/378,333

(22) Filed: Mar. 3, 2003

(65) Prior Publication Data

US 2004/0174132 A1    Sep. 9, 2004

(51) Int. Cl.
*G11B 5/584* (2006.01)
(52) U.S. Cl. .................................... 360/77.12
(58) Field of Classification Search ............. 360/77.12, 360/77.03, 77.14, 68, 75, 78.01
See application file for complete search history.

(56) References Cited

U.S. PATENT DOCUMENTS

| | | | | |
|---|---|---|---|---|
| 4,472,750 | A | * | 9/1984 | Klumpp et al. .......... 360/78.01 |
| 5,055,951 | A | * | 10/1991 | Behr ........................ 360/77.12 |
| 5,689,384 | A | | 11/1997 | Albrecht et al. |
| 5,930,065 | A | | 7/1999 | Albrecht et al. |
| 6,021,013 | A | | 2/2000 | Albrecht et al. |
| 6,169,640 | B1 | | 1/2001 | Fasen |
| 6,542,325 | B1 | * | 4/2003 | Molstad et al. ........... 360/77.12 |
| 6,574,066 | B1 | * | 6/2003 | Stubbs et al. ............ 360/77.03 |
| 6,697,209 | B1 | * | 2/2004 | Hughes et al. ........... 360/77.14 |
| 6,735,039 | B1 | * | 5/2004 | Molstad .................... 360/77.12 |
| 6,754,022 | B1 | * | 6/2004 | Molstad ....................... 360/68 |
| 6,842,305 | B1 | * | 1/2005 | Molstad et al. .......... 360/77.12 |
| 6,873,487 | B1 | * | 3/2005 | Molstad ........................ 360/75 |
| 6,950,269 | B1 | * | 9/2005 | Johnson .................... 360/77.12 |
| 2003/0165029 | A1 | * | 9/2003 | Molstad et al. .......... 360/77.12 |

* cited by examiner

*Primary Examiner*—Fred F. Tzeng
(74) *Attorney, Agent, or Firm*—Eric D. Levinson

(57) ABSTRACT

Time-based servopositioning systems, methods, formats, and data recording media used in association with the same, employing bands of signals that differ from each other in the polarity of the servo signal, or the orientation of the servo signal, or the pattern width of the servo signal.

17 Claims, 6 Drawing Sheets

BAND IDENTIFICATION IN TIME-BASED SERVOPOSITIONING FORMATS

FIELD OF THE INVENTION

This invention concerns systems and methods for time-based servopositioning in the context of linear data recording media such as magnetic tape.

BACKGROUND OF THE INVENTION

Modern data storage systems use servopositioning (or "servo") systems to guide their recording and playback components with respect to a recording medium, and thus enable high track density, which increases data storage capacity. Errors in the ability to follow the servopositioning signals on the medium can cause unacceptable reductions in storage capacity, recording/playback rates, and other parameters that are important to consumers (and thus to system manufacturers).

One type of servo patterns or formats for linear magnetic tape recording systems employs so-called time-based servo techniques, examples of which are disclosed in U.S. Pat. Nos. 5,689,384; 5,930,065; and 6,021,013 (all of which are incorporated by reference in their entireties). Commercial magnetic tape drives such as the IBM model 3570 and drives known under the names "Ultrium" and "Accelis," as described by the Linear Tape Open (LTO) consortium, use time-based servopositioning systems.

The advantages of time-based servo systems include very wide dynamic range; inherent track identification; low DC centerline error; and the ability to qualify position error signal (PES) validity by the amplitude of the servo signal. Disadvantages include extreme sensitivity to tape speed during writing; sensitivity to high frequency speed error during reading; and poor scalability to very small track pitches.

SUMMARY OF THE INVENTION

In general terms, the invention may be embodied in time-based servopositioning systems, methods, and formats, or in data recording media used in association with the same, and therefore this disclosure should be understood in that regard even if only an example of a particular embodiment is described in detail. Similarly, this disclosure should be understood to apply to either analog or digital signals, in accordance with principles known in the art. Thus, the terms "signal," "data," and the like may be used interchangeably, and should be understood to apply to either analog or digital representations of information.

In the most basic embodiments of the invention, a servopositioning system for a data recording system is used in combination with a linear data recording medium, preferably magnetic recording tape. Written or recorded on the medium are multiple bands of time-based servo signals. Adjacent bands have servo signals that differ from each other. One manner in which they differ from each other is the polarity of the servo signals, another manner is the orientation of the servo signals, and yet another manner is the pattern width of the servo signals. Appropriate circuitry responds to the differences in the format of the magnetization transitions, and thus identifies which band of signals is being sensed.

Another specific embodiment of the invention is a servopositioning system. One portion of the system is a linear magnetic data recording medium, upon which is recorded a linear magnetic data recording medium as described above. Another portion of the system is circuitry that responds to each of a pair of time-based servo read heads. This circuitry produces position error signals from each of the respective time-based servo signals. Another portion of the system is other circuitry that responds to differences between position error signals in the adjacent bands. This circuitry determines which pair of adjacent bands is producing the position error signals.

Yet another specific embodiment of the invention is a method of identifying servopositioning signals on a magnetic data recording medium as described above. The method comprises producing a pair of position error signals by reading the time-based servo signals of each of a pair of the multiple bands, and then determining which band is producing the position error signal.

BRIEF DESCRIPTION OF THE DRAWINGS

The accompanying drawings show a particular embodiment of the invention as an example, and are not intended to limit the scope of the invention.

DETAILED DESCRIPTION

In general terms, the invention can be embodied in an entire system of data recording and playback, including the combination of a drive and a linear recording medium; or as only the recording medium portion of such a system; or as methods for recording or playing back data in combination with the data recording medium. Thus, the following description focuses on only one preferred aspect of an entire system, namely the format used in the servo portions of the recording medium, to disclose the preferred embodiment of the invention. This is by way of example only, and not a limitation on the scope of the invention. It should be understood that the full scope of the invention includes other aspects of the system depending on the circumstances, such as combinations of the medium and drive, and methods of using such combinations or relevant portions of them.

Timing-based servo systems for tape drives, such as those using the LTO format, use multiple servo bands across the width of tape to segment the tape into different data regions. Typically, a pair of relatively narrow servo bands are used concurrently with a set of data writing heads and data reading heads to accurately locate and access data on a relatively wider data band lying between the servo bands. For example, a possible pattern is four wide data bands interspersed within five narrow servo bands.

Typically, each servo band is recorded with similar or identical timing based patterns that are used to develop a position error signal (PES) that represents the location of the data reading/writing heads with respect to the servo band (and thus with respect to an adjacent data band). To determine which data band is being accessed, some method of differentiating between servo bands or pairs of servo bands is required. One such method is to longitudinally offset the servo patterns, as disclosed in U.S. Pat. No. 6,169,640 (which is incorporated by reference in its entirety). The embodiments of the present invention accomplish servo band differentiation without having to longitudinally offset the timing based pattern.

Figure 1:
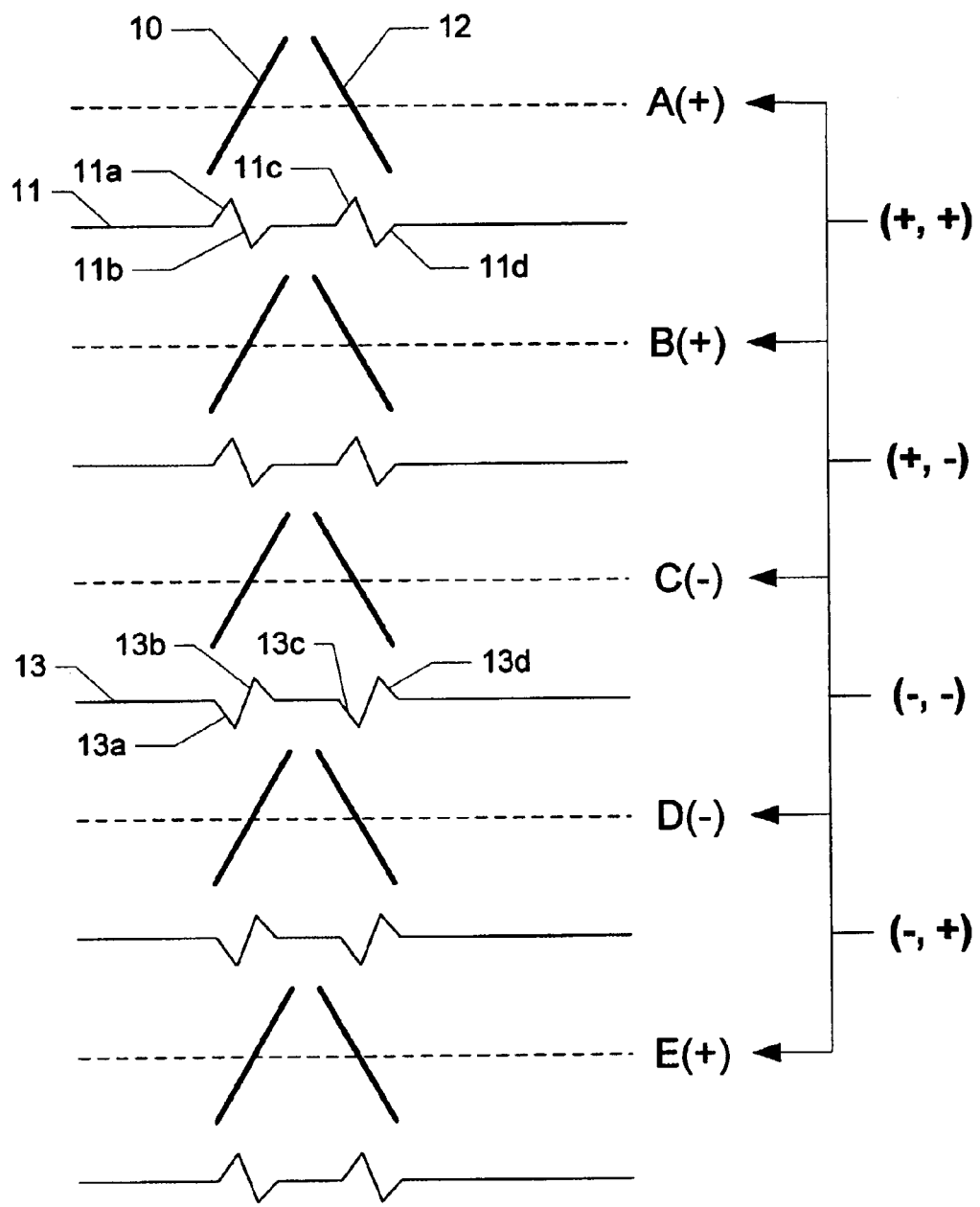
FIG. 1 is a schematic diagram of a first embodiment of the invention.

The first method is illustrated in FIG. 1. In the prior art formats, the polarity of the pattern of magnetic transitions that make up the servo signal is fixed when the first of the two servo "stripes" (i.e., the first of the two in the pair of signals that make up the pattern) is written. In prior art systems, the polarity of all servo stripes is the same.

As illustrated in FIG. 1, when a servo read head (not shown in FIG. 1) encounters a stripe, such as stripe 11, the signal 12 generated by the head resembles one cycle of a sinusoid because it has a leading pulse 11a and a trailing pulse 11b. The first pulse 11a is positive or negative depending on the polarity of the written servo signal 10. Typically, the second stripe 12 of the servo pattern also has the same polarity although it is written to the tape at a different angle as a result of the manner in which the servo read head is constructed.

In this first embodiment of the invention, the servo pattern in some of the servo bands has a reversed polarity compared to the other bands. In the example shown in FIG. 1, bands A, B, and E have conventional priority, and bands C and D have polarity that is reversed compared to bands A, B and E. The servo signals are written with the same size, angle, and the like. However, when the servo read head encounters the patterns having reversed polarity, the leading pulse is opposite of those written with normal polarity. For example, in servo band C, the signal 13 comprises leading pulses 13a14 13d that are each reversed in polarity compared to the respective portions of pulses 11a–11d of signal 11 of servo band A.

The servo system has circuitry that is designed to monitor the polarity of each servo stripe, i.e., by examining the leading pulse of the signal. Then it compares the polarities of adjacent servo bands. Using the example of FIG. 1, the A and B servo bands that are used for the uppermost data band have matching positive initial pulses. This distinguishes the (A, B) pair of servo bands from other pairs, such as the (B, C) pair that has both positive and negative initial pulses.

In the example of FIG. 1, all four data bands can be uniquely identified by determining the pattern polarity, i.e., there are four possible sets of pairs of adjacent polarities: (+,+), (+,−), (−,−), and (−,+).

Figure 2:
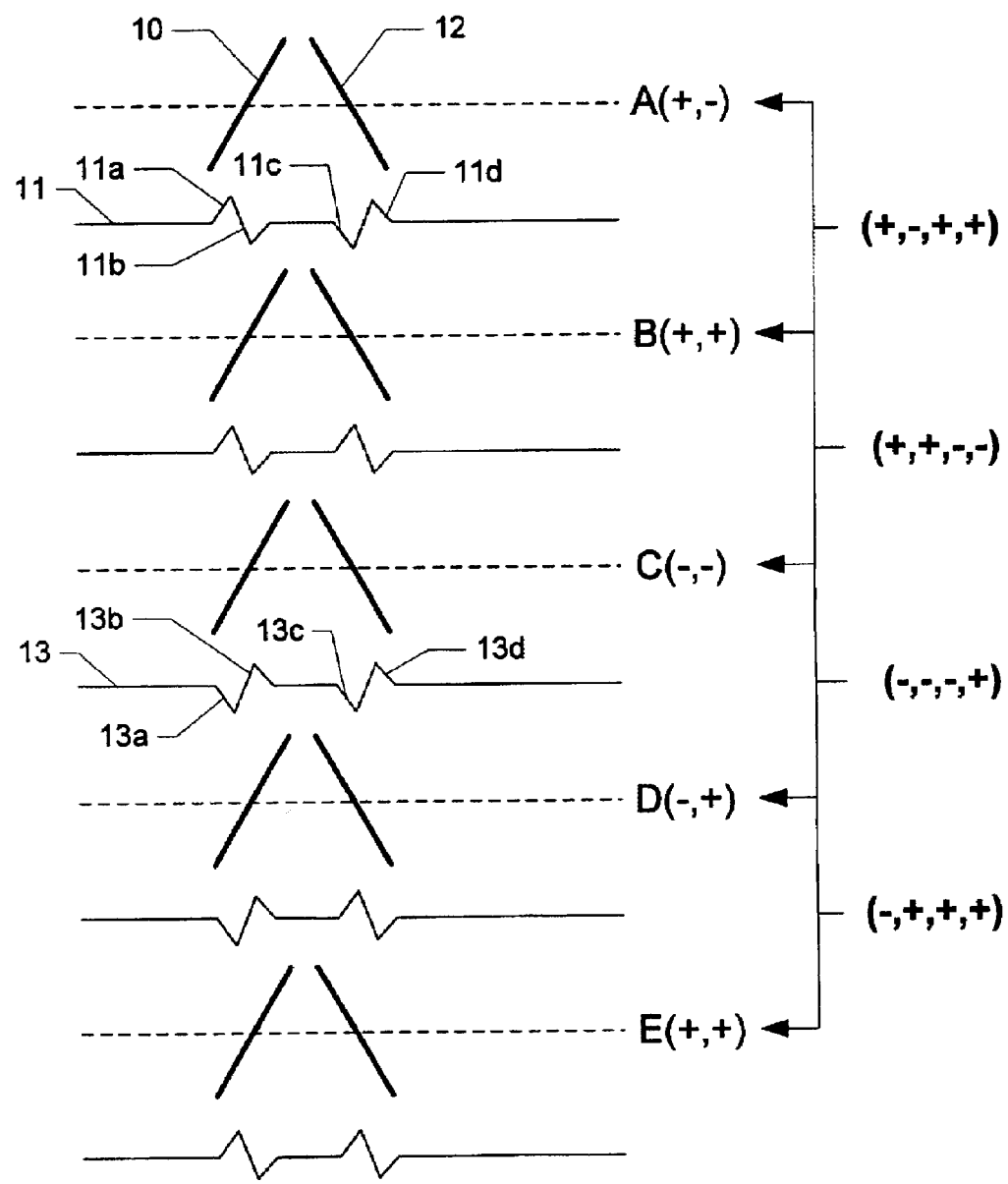
FIG. 2 is a schematic diagram of a second embodiment of the invention.

It is possible to have more than four pairs of uniquely identifiable servo bands, if the first stripe 10 and the second stripe 12 within a single servo band have different polarities. FIG. 2 is like FIG. 1 but shows an example of this specific embodiment of the invention.

Figure 3:
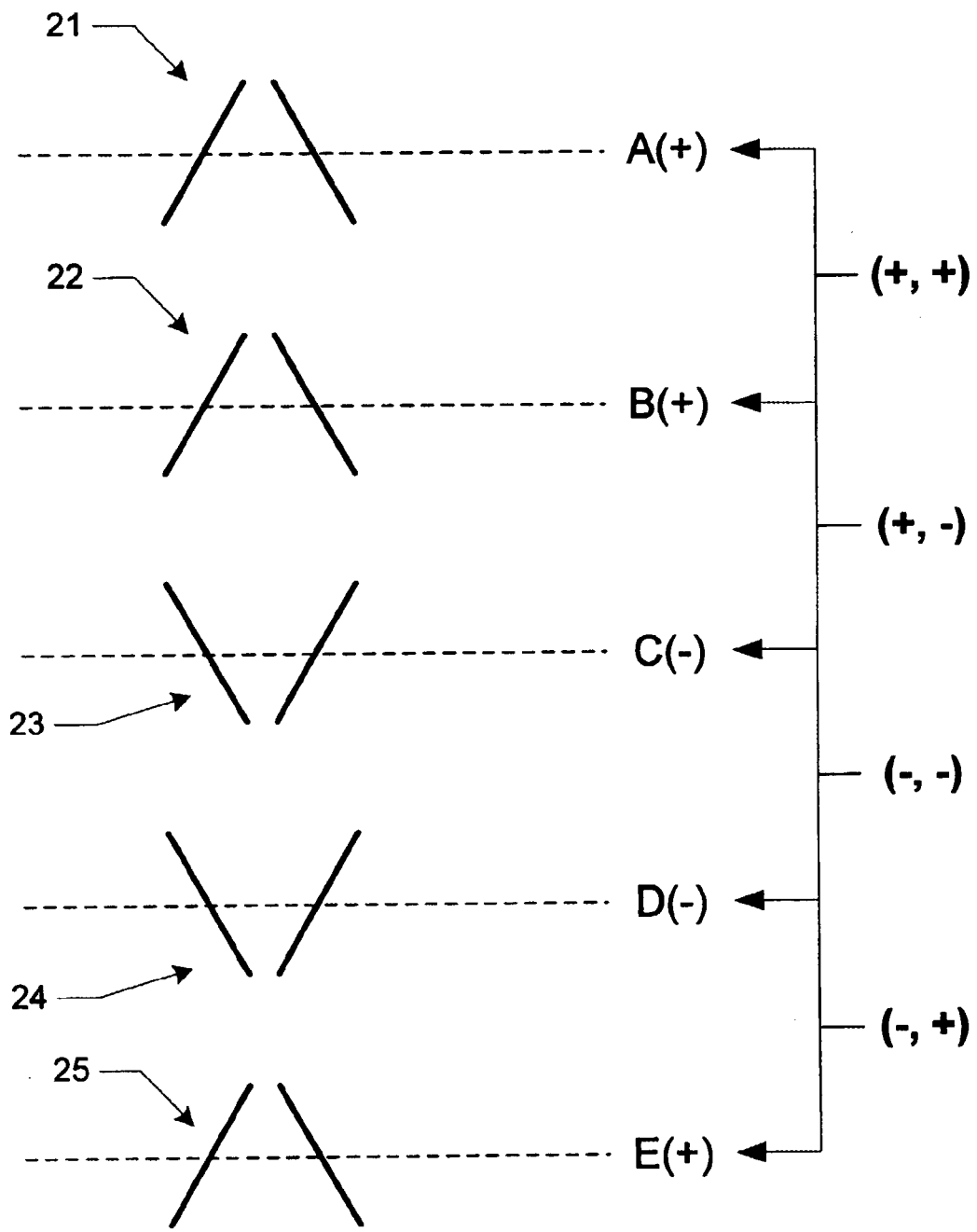
FIG. 3 is a schematic diagram of a third embodiment of the invention.

FIG. 3 illustrates a second embodiment of the invention. In this embodiment, the servo pattern of some, but not all, of the pairs has an orientation that is measurably different compared to that of the other servo bands. In the most preferred embodiment specifically shown in the Figure, it is inverted by 180° relative to the servo track. In FIG. 3, the patterns 23 and 24 of servo bands C and D, respectively, have been inverted. This can be accomplished with a conventional servo writing head having gaps oriented at each of the two angles, by simply writing the stripes of each pair in a different time sequence so that the desired result is achieved, but this is not the preferred embodiment. It is much easier to simply build a write head which has some of the gaps inverted.

Figure 4:
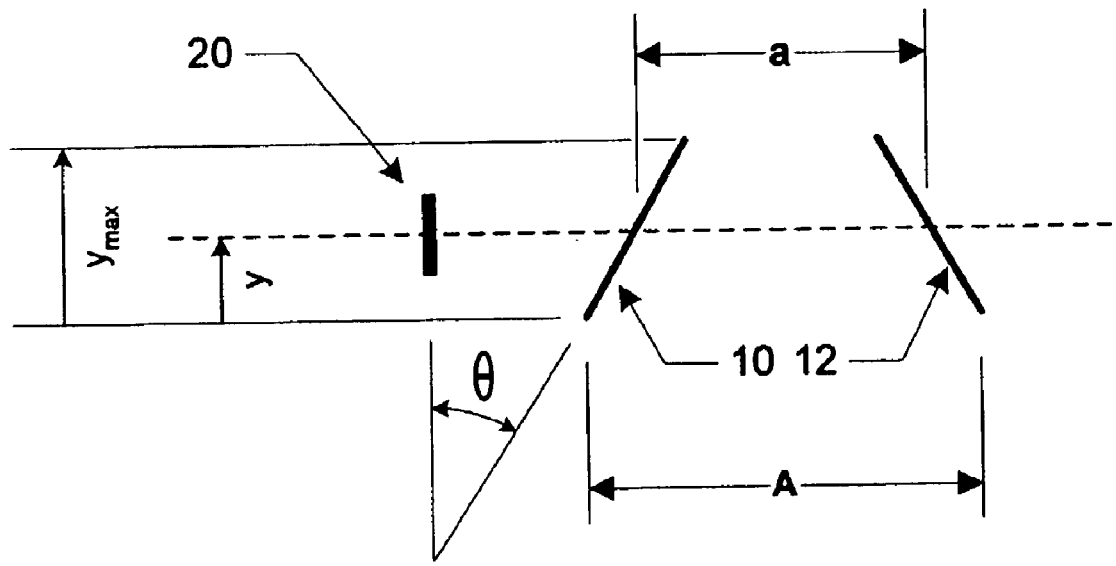
FIG. 4 is a schematic diagram of geometric relationships involved in the embodiments of the invention.

Referring to the geometric relationship of the servo pattern, as illustrated in FIG. 4, the timing-based servo pattern generates position information, commonly referred to as "Position Error Signal" of head 20, by measuring the value y, where:

$$y = \frac{(A-a)}{2\tan(\theta)} \quad (1)$$

With an inverted pattern such as those of servo bands C and D in FIG. 3, the position error signal (PES) becomes y', where $$y' = y_{max} - \frac{(A-a)}{2\tan(\theta)} \quad (2)$$

By monitoring the PES from the pair of servo bands during known motion of head 20 (for example, during deliberate motion of the servo read head in the vertical direction), the "polarity" of each servo band can be determined. The identification of the data band then proceeds as in the first method above.

In the third method, the longitudinal position of the trailing servo stripe with respect to the leading stripe is deliberately varied to provide a variation that can distinguish between servo bands.

Figure 5:
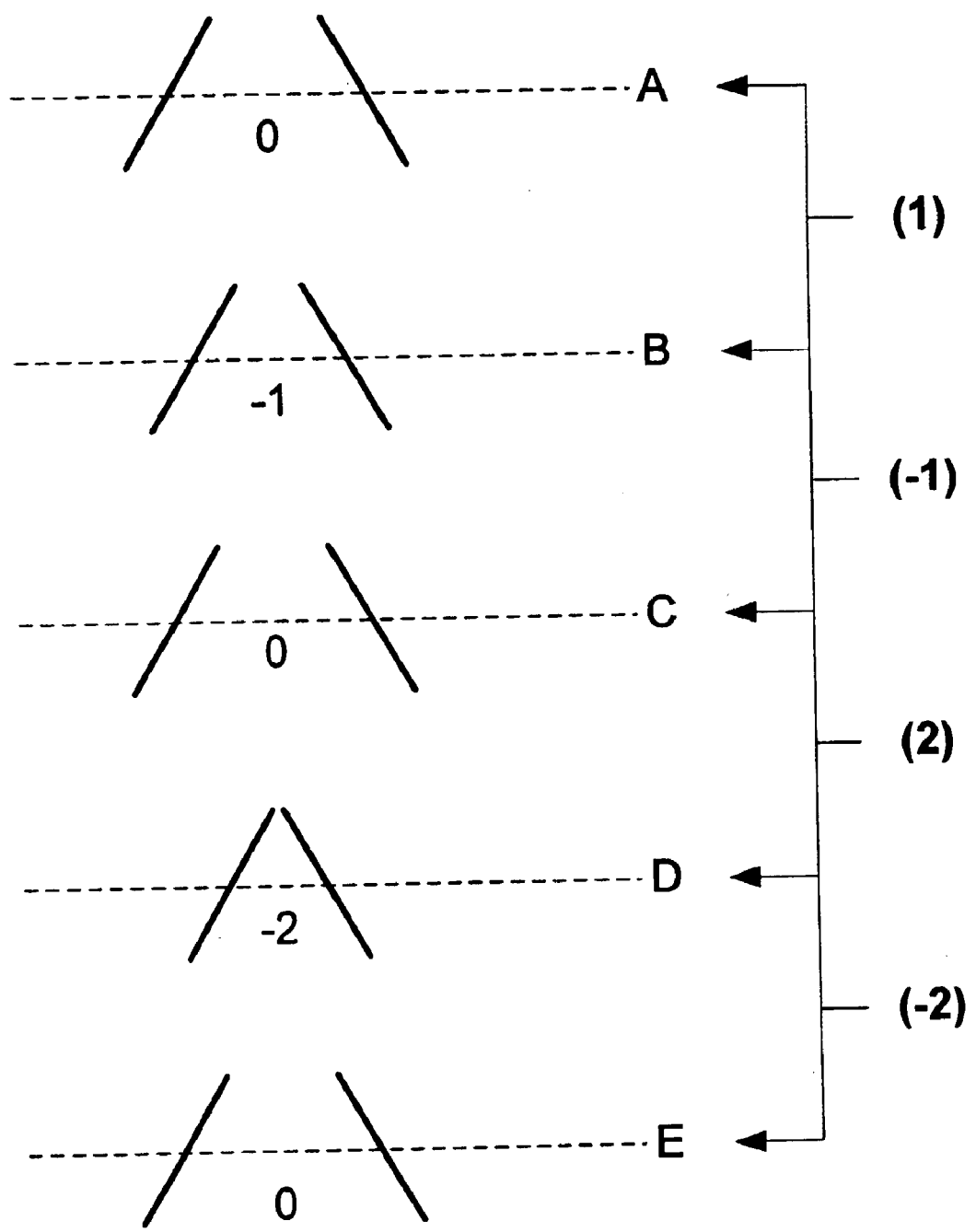
FIG. 5 is a schematic diagram of a fourth embodiment of the invention.

FIG. 5 shows one such example, in which servo bands A, C, and E are identical, servo band B is offset by one unit of an arbitrary amount of distance, while servo band D is offset by 2 units of distance. That is, servo bands A, C and E have "standard" values of a and A, but servo bands B and D have smaller values of each parameter, although the azimuth angle θ is held constant for all servo bands. Servo band B has values of the lateral separation parameters a and A that are smaller by one arbitrary unit of size than their respective values in the other three servo bands, although they remain in proportion to each other because the azimuth angle θ is constant. Similarly, servo band D also has smaller values of the two parameters, although by twice as much reduction as the corresponding values of servo bands A, C, and E.

The arbitrary amount of offset or reduction in the parameters a and A in the servo pattern should be enough to distinguish over naturally occurring offsets caused by factors such as environmental stress and tape creep, which also change the geometry of the servo patterns. Typically, PES signals of at least 5 to 10 micrometers (µm) are greater than would be indicated by such naturally occurring factors. Thus, the amount of offset required can be determined from Equation 1 by calculating values that produce at least this amount of differential in PES between servo bands.

By subtracting the PES generated by members of any adjacent pair of servo bands, the system can determine which of the four data bands is being addressed. For example, the difference between the PES of servo bands A and B yields an offset of 0−(−1)=+1 units. Similarly, difference between the PES of servo bands D and E yields an offset of −2−0=−2.

Figure 6:
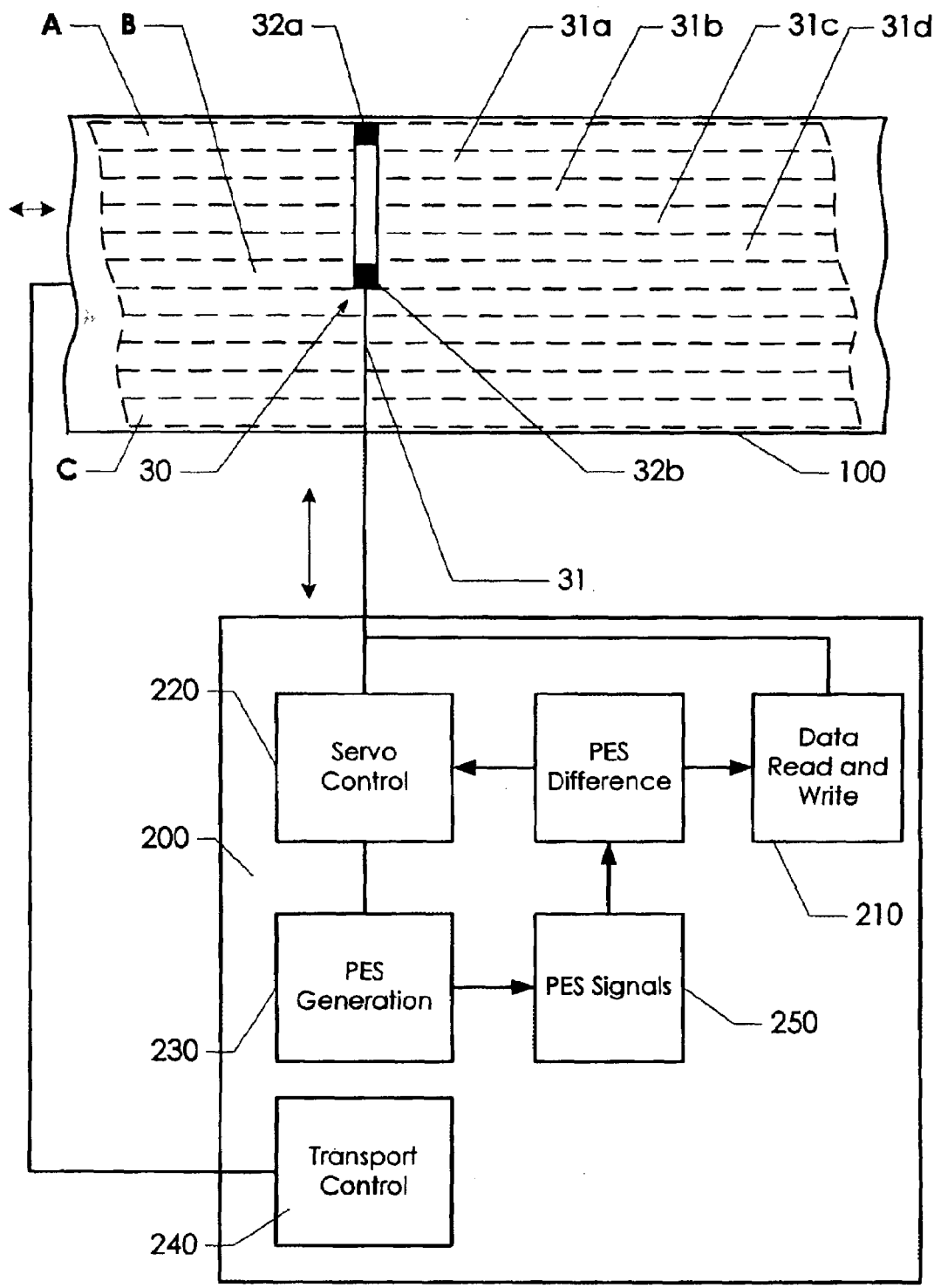
FIG. 6 is a schematic diagram of a system incorporating any of the previous embodiments of the invention.

FIG. 6 is a schematic diagram of a system incorporating any of the embodiments described above. The servo positioning system comprises a servo head assembly 30 which in turn comprises two servo read heads or transducers (or the read portions of read/write heads or transducers) 32a and 32b. In FIG. 6, for illustration only, there are three servo tracks A, B, and C arranged across the width of medium 100 in the transverse direction, i.e., perpendicular to the longitudinal direction of media motion. (In FIG. 6, the transverse direction is taken between upper and lower, and the relative motion of the medium and head is taken from side to side.) Each servo read head transducer 32a and 32b attempts to follow its assigned prerecorded servopositioning track A and B, respectively. Other areas of medium 100 are available for reading and writing data, such as data tracks 31a–31d and the others shown but not labeled for clarity.

The objective of the servopositioning system is to minimize the position error signal (PES) 250 generated by a PES generation circuit 230 of recording drive 200. PES is reduced by a closed loop servo control circuit 220, which controls the location of each servo head 32a and 32b through servo head actuator 31. Such adjustment reduces errors introduced into the data read/write circuit 210, which is connected to conventional data read and write transducers not shown for clarity. Recording drive 200 also includes medium transport control 240, which typically (but not necessarily) moves medium 100 at constant velocity. The location of assembly 30 is adjusted transversely (i.e., perpendicularly across the width of the tape, as indicated by the double headed straight arrow).

The servo band is identified by differences in PES signals generated by the servo channels from the separate heads 32a and 32b, as described in the specific embodiments disclosed above. PES generation circuit 230 determines each PES signal 250, and the PES difference is determined at 250. Servo control 220 corrects for undesirable amounts of PES by changing the location of servo head 30 (and thus the data read/write heads). The PES difference is then used to determine which data band is being accessed (in the example shown in FIG. 6, the band between servo bands A and B).

We claim:

1. A linear magnetic data recording medium, comprising multiple bands of time-based servo signals in which adjacent bands have servo signals that differ from each other in terms of at least one of the group consisting of polarity of the servo signals, orientation of the servo signals, and pattern width of the servo signals.

2. The medium of claim 1, in which adjacent bands have servo signals that differ from each other in terms of the polarity of the servo signals, and there are four sets of pairs of polarities between adjacent bands.

3. The medium of claim 1, in which adjacent bands have servo signals that differ from each other in terms of the polarity of the servo signals, and there are more than four sets of pairs of polarities between adjacent bands.

4. The medium of claim 1, in which adjacent bands have servo signals that differ from each other in terms of the orientation of the servo signals, and each servo signal comprises a pair of oppositely inverted transitions.

5. The medium of claim 1, in which adjacent bands have servo signals that differ from each other in terms of the pattern width of the servo signals, and further in which each servo signal comprises multiple stripes having a constant azimuth angle but different lateral separation.

6. A servopositioning system, comprising, in combination:
    a) a linear magnetic data recording medium, upon which are recorded multiple bands of time-based servo signals, in which adjacent bands have servo signals that differ from each other in terms of at least one of the group consisting of polarity of the servo signals, orientation of the servo signals, and pattern width of the servo signals; and
    b) first circuitry, responsive to each of a pair of time-based servo read heads, for producing position error signals from each respective time-based servo signal; and
    c) second circuitry, responsive to differences between position error signals in adjacent bands, that determines which pair of adjacent bands is producing the position error signals.

7. The system of claim 6, in which adjacent bands have servo signals that differ from each other in terms of the polarity of the servo signals, and there are four sets of pairs of polarities between adjacent bands.

8. The system of claim 6, in which adjacent bands have servo signals that differ from each other in terms of the polarity of the servo signals, and there are more than four sets of pairs of polarities between adjacent bands.

9. The system of claim 6, in which adjacent bands have servo signals that differ from each other in terms of the orientation of the servo signals, and each servo signal comprises a pair of oppositely inverted transitions.

10. The system of claim 6, in which adjacent bands have servo signals that differ from each other in terms of the pattern width of the servo signals, and further in which each servo signal comprises multiple stripes having a constant azimuth angle but different lateral separation.

11. A method of identifying servopositioning signals written on a magnetic data recording medium, comprising:
    a) writing on the magnetic data recording medium multiple bands of time-based servo signals such that adjacent bands have servo signals that differ from each other in terms of at least one of the group consisting of polarity of the servo signals, orientation of the servo signals, and pattern width of the servo signals; and
    b) producing a pair of position error signals by reading the time-based servo signals of each of a pair of the multiple bands; and
    c) determining which pair of adjacent bands is producing the position error signals.

12. The method of claim 11, in which adjacent bands have servo signals that differ from each other in terms of the polarity of the servo signals, and there are four sets of pairs of polarities between adjacent bands.

13. The method of claim 11, in which adjacent bands have servo signals that differ from each other in terms of the polarity of the servo signals, and there are more than four sets of pairs of polarities between adjacent bands.

14. The method of claim 11, in which adjacent bands have servo signals that differ from each other in terms of the orientation of the servo signals, and each servo signal comprises a pair of oppositely inverted transitions.

15. The method of claim 11, in which the adjacent bands have servo signals that differ from each other in terms of the orientation of the servo signals, and further comprising monitoring position error signals from each of a pair of the multiple bands during known head motion.

16. The method of claim 11, in which adjacent bands have servo signals that differ from each other in terms of the pattern width of the servo signals, and further in which each servo signal comprises multiple stripes having a constant azimuth angle but different lateral separation.

17. The method of claim 11, in which the adjacent bands have servo signals that differ from each other in terms of a pattern width of the servo signals between adjacent bands that is greater than 5 micrometers.

* * * * *